(12) United States Patent
Zhu et al.

(10) Patent No.: US 7,345,130 B2
(45) Date of Patent: Mar. 18, 2008

(54) SILANE FUNCTIONAL PREPOLYMER AND ISOCYANATE FUNCTIONAL PREPOLYMER BLEND BASED ADHESIVE COMPOSITION

(75) Inventors: Huide D. Zhu, Rochester, MI (US); Syed Z. Mahdi, Rochester Hills, MI (US); Matthew B. Feldpausch, Waterford, MI (US)

(73) Assignee: Dow Global Technologies Inc., Midland, MI (US)

( * ) Notice: Subject to any disclaimer, the term of this patent is extended or adjusted under 35 U.S.C. 154(b) by 0 days.

(21) Appl. No.: 11/585,010

(22) Filed: Oct. 23, 2006

(65) Prior Publication Data

US 2007/0093628 A1    Apr. 26, 2007

(51) Int. Cl.
C08G 77/08    (2006.01)

(52) U.S. Cl. ............... 528/17; 156/329; 156/331.4; 428/447; 528/18; 528/28; 528/23

(58) Field of Classification Search ............ 528/17, 528/18, 23, 28; 156/329, 331.4; 428/447
See application file for complete search history.

(56) References Cited

U.S. PATENT DOCUMENTS

| | | |
|---|---|---|
| 3,707,521 A | 12/1972 | De Santis |
| 3,779,794 A | 12/1973 | De Santis |
| 3,971,751 A | 7/1976 | Isayama et al. |
| 3,979,344 A | 9/1976 | Bryant et al. |
| 4,345,053 A | 8/1982 | Rizk et al. |
| 4,374,237 A | 2/1983 | Berger et al. |
| 4,525,511 A | 6/1985 | Kirby et al. |
| 4,618,656 A | 10/1986 | Kawakubo et al. |
| 4,622,369 A | 11/1986 | Chang et al. |
| 4,625,012 A | 11/1986 | Rizk et al. |
| 4,645,816 A | 2/1987 | Pohl et al. |
| 4,652,610 A | 3/1987 | Dowbenko et al. |
| 4,687,533 A | 8/1987 | Rizk et al. |
| 4,780,520 A | 10/1988 | Rizk et al. |
| 4,788,254 A | 11/1988 | Kawakubo et al. |
| 4,906,707 A | 3/1990 | Yukimoto et al. |
| 4,923,927 A | 5/1990 | Hirose et al. |
| 4,954,598 A | 9/1990 | Baghdachi et al. |
| 4,960,844 A | 10/1990 | Singh |
| 4,977,228 A | 12/1990 | Wakabayashi et al. |
| 5,011,900 A | 4/1991 | Yukimoto et al. |
| 5,063,269 A | 11/1991 | Hung |
| 5,063,270 A | 11/1991 | Yukimoto et al. |
| 5,097,053 A | 3/1992 | Baghdachi et al. |
| 5,147,927 A | 9/1992 | Baghdachi et al. |
| 5,223,597 A | 6/1993 | Iwakiri et al. |
| 5,342,914 A | 8/1994 | Iwakiri et al. |
| 5,409,995 A | 4/1995 | Iwahara et al. |
| 5,525,654 A | 6/1996 | Podola et al. |
| 5,539,045 A | 7/1996 | Potts et al. |
| 5,554,709 A | 9/1996 | Emmerling et al. |
| 5,567,833 A | 10/1996 | Iwahara et al. |
| 5,603,798 A | 2/1997 | Bhat |
| 5,623,044 A | 4/1997 | Chiao |
| 5,650,467 A | 7/1997 | Suzuki et al. |
| 5,852,137 A | 12/1998 | Hsieh et al. |
| 5,952,052 A | 9/1999 | Hattori et al. |
| 5,976,305 A | 11/1999 | Bhat et al. |
| 6,015,475 A | 1/2000 | Hsieh et al. |
| 6,255,434 B1 | 7/2001 | McGraw et al. |
| 6,271,333 B1 * | 8/2001 | Okuhira ................ 528/28 |
| 6,355,317 B1 | 3/2002 | Reid et al. |
| 6,512,033 B1 | 1/2003 | Wu |
| 6,602,964 B2 | 8/2003 | Huang et al. |
| 6,649,016 B2 * | 11/2003 | Wu et al. .............. 156/329 |
| 6,803,412 B2 | 10/2004 | Nguyen-Misra et al. |
| 2004/0071977 A1 | 4/2004 | Shah |
| 2004/0181007 A1 | 9/2004 | Acevedo et al. |
| 2006/0124225 A1 * | 6/2006 | Wu et al. .............. 156/108 |

FOREIGN PATENT DOCUMENTS

WO    WO 98/18843    5/1998

\* cited by examiner

*Primary Examiner*—Margaret G. Moore
(74) *Attorney, Agent, or Firm*—Norman L. Sims

(57) ABSTRACT

The invention is an adhesive composition comprising a) one or more silane functional prepolymers comprising a polyether or a polyolefin backbone and silane moieties capable of silanol condensation; b) one or more isocyanate functional prepolymers comprising a polyether backbone and isocyanate moieties; c) one or more organotin compounds or titanate or zirconate compounds having one or more ligands comprising a hydrocarbyl phosphate ester or a hydrocarbyl sulfonate ester, or a mixture thereof; d) a tertiary amine or an anhydrous strong organic acid which is miscible with the polymer and enhances the bonding of the adhesive to a coated unprimed substrate. In one embodiment, the invention is a method of bonding two or more substrates together using the adhesive compositions of this invention. The process comprises applying an adhesive as described herein to one or more of the substrates; contacting the one or more substrates with the adhesive disposed between the substrates; and allowing the adhesive to cure.

19 Claims, No Drawings

SILANE FUNCTIONAL PREPOLYMER AND ISOCYANATE FUNCTIONAL PREPOLYMER BLEND BASED ADHESIVE COMPOSITION

BACKGROUND OF THE INVENTION

This invention relates to an adhesive composition comprising a blend of one or more silane functional prepolymers and one or more isocyanate functional prepolymers and to a method of bonding two or more substrates together using the adhesive composition. Preferably, a window is bonded to a window flange using the adhesive of the invention.

Polyurethane sealant compositions are used for bonding non-porous substrates, such as glass, to nonporous substrates; these are described in Berger et. al., U.S. Pat. No. 4,374,237 and Rizk et. al., U.S. Pat. No. 4,687,533, both incorporated herein by reference. Berger et. al., U.S. Pat. No. 4,374,237 describes a polyurethane sealant containing urethane prepolymers which have been further reacted with secondary amine compounds containing two silane groups. Rizk et. al., U.S. Pat. No. 4,687,533 describes a polyurethane sealant containing urethane prepolymers which contain silane groups which have been prepared by reacting a polyisocyanate having at least three isocyanate groups with less than an equivalent amount of an alkoxysilane having a terminal group containing active hydrogen atoms reactive with isocyanate groups to form an isocyanatosilane having at least two unreacted isocyanate groups. In a second step, the isocyanatosilane is mixed with additional polyisocyanate and the mixture is reacted with a polyol to form a polyurethane prepolymer having terminal isocyanato groups and pendant alkoxysilane groups.

Hattori et. al., EP 856,569 discloses the use of polyoxyalkylene polymer terminated with silanes having hydrolyzable groups bonded thereto blended with a polyoxyalkylene polymer having no cross-linking groups to bond glass to metal. Wu, U.S. Pat. No. 6,649,016 discloses an adhesive which bonds primerless to painted substrates comprising: A) one or more polymers having a flexible backbone and silane moieties capable of silanol condensation; B) one or more titanates or zirconates having one or more ligands comprising hydrocarbyl phosphate esters and/or a hydrocarbyl sulfonate esters; and C) an anhydrous strong organic acid which is miscible with the polymer and enhances the bonding of the adhesive to a coated substrate in the absence of a primer. Hsieh et al., U.S. Pat. No. 6,015,475 discloses an isocyanate functional prepolymer based adhesive composition which bonds primeness to painted substrates.

Such sealants are used to bond glass substrates to painted substrates. Typically, a separate glass primer comprising a solution of one or more silanes is typically applied to the glass substrate prior to the application of the adhesive. This is the case in most vehicle assembly operations for bonding the windshield and the rear window to the vehicle. The use of a primer in assembly operations is undesirable in that it introduces an extra step, additional cost and exposes the assembly line operators to additional chemicals.

The automobile producers demand an adhesive for bonding glass into a vehicle which cures rapidly so that the vehicle can be moved without the glass falling out or slipping from the desired location. Additionally, it is important that the adhesive demonstrate stability prior to application, that is does not cure before being applied to bond the glass into the vehicle. If the adhesive cures in the delivery system in the auto plant, the assembly line must be shut down while the adhesive delivery system is purged. Such a shut down is very costly for the automotive companies and must be avoided. Automobiles last upwards of 10 years and the adhesive needs to maintain its' integrity and hold the window into the vehicle for the life of the vehicle under a variety of difficult conditions. Thus, what is needed is an adhesive which can bond to the automotive paints, especially difficult to bond to paints, and glass; which can bond windows into a vehicle without the need to use a primer, which adhesive also demonstrates strong adhesion, rapid adhesive strength build up, fast link-up, good stability and long term durability.

SUMMARY OF THE INVENTION

The invention is an adhesive composition comprising a) one or more silane functional prepolymers comprising a polyether or a polyolefin backbone and silane moieties capable of silanol condensation; b) one or more isocyanate functional prepolymers comprising a polyether backbone and isocyanate moieties; c) one or more organotin compounds or titanate or zirconate compounds having one or more ligands comprising a hydrocarbyl phosphate ester or a hydrocarbyl sulfonate ester, or a mixture thereof; d) one or more anhydrous strong organic acids which are miscible with the polymer and enhances the bonding of the adhesive to a coated unprimed substrate.

In one embodiment, the invention is a method of bonding two or more substrates together using the adhesive compositions of this invention. The process comprises applying an adhesive as described herein to one or more of the substrates; contacting the one or more substrates with the adhesive disposed between the substrates; and allowing the adhesive to cure. Preferably, the method is used to bond glass to a coated substrate, such as a window to a vehicle. Preferably, the adhesive is bonded to a ceramic frit disposed about the periphery of the window. Preferably, the substrate is coated with paint. Preferably the window, the coated substrate or both are unprimed when contacted with the adhesive. Preferably, the paint is an acid resistant paint.

The adhesive and method of the invention allows the bonding of glass to a coated substrate without the need for priming the glass and/or the surface of the substrate to which it is bonded. This is especially useful for bonding windows into automobiles. The adhesive further demonstrates excellent adhesive and cohesive strength, excellent stability before application, rapid cure rate, rapid link up and long term durability.

DETAILED DESCRIPTION OF THE INVENTION

The adhesive composition of the invention contains a polymer having a polyoxyalkylene or polyolefin backbone and silane moieties capable of silanol condensation. The polymer with a flexible backbone can be any polyoxyalkylene or polyolefin polymer with a flexible backbone which can be functionalized with a silane moiety capable of silanol condensation. The polymer may further comprise linking groups which connect the polyolefin or polyoxyalkylene polymer backbone to the silane moieties. Among preferred linking groups are alkylene, thioalkylene, urethane and urea groups. Among more preferred polymer backbones are the polyoxyalkylene ethers. Preferably, the polyoxyalkylene or polyolefin based polymer does not contain polyurethane or polyurea linkages. Preferably, the silane moieties capable of silanol condensation are linked to the flexible backbone through alkylene or thioalkylene linkages, preferably alkylene linkages. Preferably the silane functional prepolymers consist essentially of oxyalkylene and/or polyolefin units, alkylene units and silane moieties capable of silanol condensation. Silanol condensation refers to the set of reactions whereby a hydrolyzable moiety is cleaved off from the silane moiety to form a hydroxyl moiety which then reacts with another silane moiety to cleave off a hydrolyzable moiety and replace it with the prepolymer backbone to which the hydroxyl was bonded. A hydrogen is cleaved off from the hydroxyl formed from the first hydrolyzation. Alkylene linkages are multivalent aliphatic hydrocarbon moieties. Prepolymer as used herein refers to a polymeric unit which contains reactive groups which under specified conditions are capable of reacting to form a larger polymer. Examples of the silane functional prepolymers useful in the invention are those disclosed in Yukimoto et al., U.S. Pat. No. 4,906,707; Iwakiri et al., U.S. Pat. No. 5,342,914; Yukimoto, U.S. Pat. No. 5,063,270; Yukimoto et al., U.S. Pat. No. 5,011,900; and Suzuki et al., U.S. Pat. No. 5,650,467, all incorporated herein by reference.

More preferably the oxyalkylene polymers contain at least one reactive silicon group per molecule. The oxyalkylene polymer which can be used in the present invention includes polymers having a molecular chain represented by formula (1):

$$-(R-O)_n- \quad (1)$$

wherein R represents a divalent alkylene group having 2 to 4 carbon atoms, and preferably 2 to 3 carbon atoms; and n represents the number of repeating units. The oxyalkylene polymer may have a straight chain or a branched structure, or a mixed structure thereof. From the viewpoint of availability an oxyalkylene polymer having a repeating unit represented by formula (2) is preferred:

$$-CH(CH_3)CH_2O- \quad (2).$$

The polymer may contain other monomer units but preferably comprises oxyalkylene monomeric units, such as the monomer unit of formula (1), in a proportion of at least about 50 percent by weight, more preferably about 80 percent by weight or more, even more preferably about 90 percent by weight or greater, and most preferably all of the monomeric units are oxyalkylene units such as those described by formula (1).

The terminology "reactive silicon group" or "reactive silane capable of silanol condensation" means a silicon-containing group in which a hydrolyzable group or a hydroxyl group is bonded to the silicon atom and which is cross-linkable through silanol condensation reaction. Preferred reactive silicon groups are represented by formula (3):

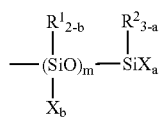

wherein $R^1$ and $R^2$ each represent an alkyl group having 1 to 20 carbon atoms, an aryl group having 6 to 20 carbon atoms, an aralkyl group having 7 to 20 carbon atoms or a triorganosiloxy group represented by $(R')_3SiO-$, wherein each of the three R' groups, which may be the same or different, represents a monovalent hydrocarbon group having 1 to 20 carbon atoms; when there are two or more of each of the $R^1$ or $R^2$ groups, each of the $R^1$ and $R^2$ groups may be the same or different, and the $R^1$ can be the same or different from $R^2$; X is independently in each occurrence a hydroxyl group or a hydrolyzable group; a is independently in each occurrence 0, 1, 2 or 3; and b is independently in each occurrence 0, 1 or 2; and m represents 0 or an integer of from about 1 to about 19; wherein a and b are chosen to satisfy the relationship $a+\Sigma b \geq 1$.

The hydrolyzable group represented by X is not particularly limited and is selected from conventional hydrolyzable groups. Preferred hydrolyzable groups are a hydrogen atom, a halogen atom, an alkoxy group, an acyloxy group, a ketoximate group, an amino group, an amido group, an acid amido group, an amino-oxy group, a mercapto group, and an alkenyloxy group. More preferred are a hydrogen atom, an alkoxy group, an acyloxy group, a ketoximate group, an amino group, an amido group, an amino-oxy group, a mercapto group, and an alkenyloxy group. Alkoxy groups are more preferred because of the ease in handling due to their mild hydrolyzability, with a methoxy or ethoxy group being most preferred. One to three hydroxyl groups or hydrolyzable groups may be bonded to one silicon atom, and $(a+\Sigma b)$ is preferably 1 to 5. Where two or more hydroxyl groups or hydrolyzable groups are present per reactive silicon group, they may be the same or different. The reactive silicon group may have one or more silicon atoms. A reactive silicon group in which silicon atoms are linked to form siloxane bondings may have as much as 20 silicon atoms. From the standpoint of availability, reactive silicon groups represented by formula (4) shown below are preferred:

wherein $R^1$, X, and a are as defined above. $R^1$ is preferably an alkyl group; a cycloalkyl group; an aryl group; an aralkyl group; or a triorganosiloxy group of formula $(R')_3SiO-$ in which R' is defined above. $R^1$, $R^2$ and R' are more preferably methyl, ethyl, cyclohexyl, phenyl or benzyl group. $R^1$, $R^2$ and R' are most preferably a methyl group.

The silane functional prepolymer contains at least one, and preferably about 1.1 to about 6 reactive silicon groups per molecule. If the number of the reactive silicon group per molecule is less than 1, the polymer has insufficient curability, failing to achieve satisfactory rubbery elasticity. The reactive silicon group may be placed either at the terminal or in the inside of the molecular chain of the silane functional prepolymer. A silane functional prepolymer having the reactive silicon group at the molecular terminal thereof tends to provide a rubbery cured product having high tensile strength and high elongation.

In one embodiment, the flexible polymer used in the adhesive composition is a silyl terminated prepolymer prepared by contacting a polyol as described herein with an isocyanato silane having at least one silane moiety which has bonded thereto a hydrolyzable moiety under conditions such that the hydroxyl moieties of the polyol react with the isocyanate moieties of the isocyanatosilane so as to place a terminal silane moiety on the polyol. Polyols which may be used to prepare the silane functional prepolymer include polyols useful in preparing polyurethane prepolymers useful in adhesive and elastomer applications and are well known to those skilled in the art. Bhat et al., U.S. Pat. No.

5,672,652, see column 4, lines 5 to 60, (relevant parts incorporated herein by reference) discloses the preferred polyols useful in preparing the silane terminated prepolymers.

In one embodiment, the polyols used in preparing the silane functional prepolymers are high molecular weight polyols prepared by the process which comprises first, contacting one or more initiators with one or more alkylene oxides in the presence of a catalyst comprising calcium having counterions of carbonate and a $C_6$-$C_{10}$ alkanoate in a solvent which does not contain active hydrogen atoms as disclosed in McGraw et. al., U.S. Pat. No. 6,255,434 (incorporated herein by reference). Preferably the process is performed such that a polyol is prepared which has an equivalent weight of from about 1,000 to about 20,000, a polydispersity of about 1.5 or less and a residual calcium level of from about 0 to about 2,000 parts per million (ppm). Preferably the process is performed such that the amount of catalyst used is sufficient such that the residual catalyst remaining in the polyol upon completion of the reaction is about 0 part per million or greater, preferably about 1 part per million or greater, more preferably about 200 parts per million or greater, even more preferably about 300 parts per million or greater and most preferably about 400 parts per million or greater, and preferably about 2,000 parts per million or less, more preferably about 1,000 parts per million or less, even more preferably about 800 parts per million or less and most preferably about 400 parts per million or less. In some embodiments, it may be desirable to remove all of the residual catalyst where the catalyst is not needed for a further reaction and where the catalyst may impact the properties of the ultimate adhesive. Polyoxyalkylene based polyether polyols prepared using double metal cyanide catalysts can also be used in this invention. They are especially attractive because of their low unsaturation level.

The oxyalkylene polyols (polyether polyols) used in the invention preferably have weight average molecular weights of about 1,000 or greater, more preferably about 2,000 or greater, even more preferably about 3,000 or greater, even more preferably about 6,000 or greater and most preferably about 10,000 or greater. The oxyalkylene polyol used in the invention preferably have weight average molecular weights of about 50,000 or less, more preferably about 40,000 or less, even more preferably about 30,000 or less, and most preferably about 25,000 or less. The oxyalkylene polyols preferably have polydispersities of about 1.5 or less and more preferably about 1.2 or less. Preferably, the oxyalkylene polyols also demonstrate low unsaturation levels, preferably about 0.04 milliequivalent of unsaturation per gram of polyol or less and more preferably about 0.02 milliequivalent of unsaturation per gram of polyol or less.

Polyolefin backbones useful herein include any polymeric chains derived from olefins which are flexible in nature. Flexible as used herein means the polymer has a glass transition temperature less than or equal to 20° C. Preferable olefins used to prepare the polymeric chains, include $C_{1-12}$ straight and branched chain compounds having one or more double bonds, including mixtures thereof. Among more preferred olefins used to prepare the polymeric chains are ethylene, propylene, butylene, octene, butadiene, isoprene and mixtures thereof. Also included as useful polyols are polymers having a polyolefin backbone and terminal hydroxyl groups. Examples of such polyols are KRATON™ polyethylene/butylene polymers having terminal hydroxyls such as KRATON™ Liquid L-2203 polymer.

In one embodiment where the backbone of the silane functional prepolymer is an oxyalkylene polyether or polyolefin, having silicon moieties bound thereto, the silane moieties may be bound to the backbone as described hereinafter. The flexible polymer with unsaturation can be reacted with a compound having a hydrogen or hydroxyl moiety bound to silicon wherein the silicon moiety also has one or more carbon chains with unsaturation at the point of unsaturation by a hydrosilylation reaction. This reaction is described in Kawakubo, U.S. Pat. No. 4,788,254, column 12, lines 38 to 61; Isayama et. al., U.S. Pat. No. 3,971,751; Iwakiri et. al., U.S. Pat. No. 5,223,597; Hirose et. al., U.S. Pat. No. 4,923,927; Iwahara et. al., U.S. Pat. No. 5,409,995 and Iwahara et. al., U.S. Pat. No. 5,567,833, incorporated herein by reference.

In one embodiment, the polyols can be reacted with an isocyanato silane to prepare reactive silicone functional prepolymers. Such isocyanato silane requires a silane group with a hydrolyzable moiety attached thereto. Isocyanato silanes useful in the invention are described in Kawakubo et. al., U.S. Pat. No. 4,618,656 at column 3, lines 24 to 34, incorporated herein by reference. Preferably such isocyanato silanes correspond to Formula 5;

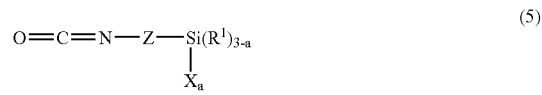

(5)

wherein a, $R^1$ and X are as defined hereinbefore. Z is independently in each occurrence, $C_{1-40}$ divalent hydrocarbyl moiety. Z is preferably a $C_{1-20}$ divalent hydrocarbyl moiety, preferably $C_{1-10}$ alkylene, more preferably $C_{1-3}$ alkylene and most preferably methylene.

The reaction of the polyol with an organo functional silane can be performed using conventional processes such as those disclosed in Rizk et. al., U.S. Pat. No. 4,625,012, incorporated herein by reference. The use of the high molecular weight polyols prepared using calcium catalysts as disclosed in McGraw et. al., U.S. Pat. No. 6,255,434 allow the preparation of silane terminated polyethers by the reaction of isocyanato silanes with the polyols without the addition of additional catalysts. The residual calcium catalyst from the polyol formation reaction sequence described above is sufficient to catalyze the reaction. If desired, a standard polyurethane catalyst such as those disclosed in Rizk et. al., U.S. Pat. No. 4,625,012 at column 5, lines 14 to 23, incorporated herein by reference, may be added. Where a high molecular weight polyol is used it is preferred that a sufficient amount of isocyanato silane be used to react with all of the hydroxyl functionality of the polyol. In this embodiment, the resulting prepolymer exhibits excellent physical properties and stability. Where the polyol used is a lower molecular weight polyol, it is desirable to use less than a stoichiometric amount of isocyanatosilane as compared to hydroxyl moieties, such that the resulting product has some residual hydroxyl moieties in the prepolymer prepared. This results in a product that has better physical properties at cure. In this embodiment, the ratio of hydroxyl moieties to isocyanate moieties of the isocyanoto silanes is preferably from about 0.75:1.0 to 0.95:1.0. In another embodiment, the polymer is a polyurethane based polymer having hydrolyzable silane groups. Such materials are disclosed in Chang, U.S. Pat. No. 4,622,369 and Pohl, U.S. Pat. No. 4,645,816, relevant portions incorporated herein by reference.

The silane functional prepolymer is present in the adhesive composition in sufficient amount such that the adhesive is capable of bonding glass to another substrate, such as metal, plastic, a composite or fiberglass. Preferably the substrates are coated (painted) and more preferably the substrates are painted with acid resistant paints, such as acrylic melamine silane modified coatings, melamine carbamate coatings, two part urethane coatings, or acid epoxy cure coatings. The adhesives of the invention are especially good for bonding windows to the urethane acrylic melamine and the melamine carbamate paints. Preferably the silane functional prepolymer is present in an amount of about 1 part by weight or greater based on 100 parts of the adhesive, more preferably about 10 parts by weight or greater, even more preferably about 20 parts by weight or greater and most preferably about 30 parts by weight or greater. Preferably, the silane functional prepolymer is present in an amount of about 70 parts by weight or less based on 100 parts of the adhesive, and even more preferably about 60 parts by weight or less and most preferably about 50 parts by weight or less.

The system of the invention includes any isocyanate functional prepolymer which is designed for use in adhesives useful for bonding to non-porous surfaces such as metal, coated plastic and/or glass. Preferably these are isocyanate functional polyurethane prepolymers. Examples of useful adhesive systems having such isocyanate functional prepolymers are disclosed in Berger et. al., U.S. Pat. No. 4,374,237, Rizk et. al., U.S. Pat. No. 4,687,533, Rizk et. al., U.S. Pat. No. 4,780,520, Hung, U.S. Pat. No. 5,063,269, Chiao, U.S. Pat. No. 5,623,044, Bhat, U.S. Pat. No. 5,603,798, Hsieh, U.S. Pat. No. 5,852,137, Bhat, U.S. Pat. No. 5,976,305, U.S. Pat. No. 5,852,137, Wu, U.S. Pat. No. 6,512,033, relevant portions, incorporated herein by reference.

The isocyanate functional polyurethane prepolymers used in the invention can be conventional prepolymers used in polyurethane adhesive compositions. In a preferred embodiment the isocyanate functional prepolymer contains silane functionality as well as isocyanate functionality. The preparation of polyurethane prepolymer having silane functionalities are known to those in the art. For example, a silane having an active hydrogen atom reactive with isocyanate moieties can be reacted with terminal isocyanate moieties of prepolymers. Preferably, such silane is a mercapto-silane or an amino-silane and more preferably is a mercapto-trialkoxy-silane or an amino-trialkoxy silane. Such reaction products are disclosed in U.S. Pat. Nos. 4,374,237 and 4,345,053, relevant parts incorporated herein by reference. In yet another example, a silane having a reactive hydrogen moiety reactive with an isocyanate moiety can be reacted into the backbone of the prepolymer by reacting such silane with the starting materials during the preparation of the prepolymer. The process for the preparation of prepolymers containing silane in the backbone is disclosed in U.S. Pat. No. 4,625,012, relevant portions incorporated herein by reference. Such silane, having active hydrogen moieties, can be reacted with a polyisocyanate to form an adduct which is blended with the prepolymer or reacted with a polyisocyanate and a compound having on average more than one moiety reactive with an isocyanate moiety. Preferably, the adduct is a reaction product of a secondary amino- or mercapto-alkoxy silane and a polyisocyanate as described in Chiao, U.S. Pat. No. 5,623,044, incorporated herein by reference. An isocyante functional prepolymer having silane functionality may be blended with a prepolymer which does not have silane functionality. Preferable isocyanate functional prepolymers include those having an average isocyanate functionality of at least about 2.0 and a molecular weight of at least about 2,000. Preferably, the average isocyanate functionality of the prepolymer is at least about 2.2, and is more preferably at least about 2.4. Preferably the isocyanate functionality is no greater than about 4.0, more preferably no greater than about 3.5 and most preferably no greater than about 3.0. Preferably, the weight average molecular weight of the prepolymer is at least about 2,500, and is more preferably at least about 3,000; and is preferably no greater than about 40,000, even more preferably no greater than about 20,000, more preferably, no greater than about 15,000 and is most preferably no greater than about 10,000. The prepolymer may be prepared by any suitable method, such as by reacting an isocyanate-reactive compound containing at least two isocyanate-reactive groups with an excess over stoichiometry of a polyisocyanate under reaction conditions sufficient to form the corresponding prepolymer. See Hsieh et al., U.S. Pat. No. 5,852,137, column 4, line 65 to column 5, line 7, incorporated herein by reference. Preferable polyisocyanates for use in preparing the prepolymer are disclosed in Hsieh et al., U.S. Pat. No. 5,852,137 at column 2, line 40 to column 3, line 45, incorporated herein by reference. Preferably the isocyanate used is 1,3 phenylene diisocyanate, 1,4 phenylene diisocyanate, 2,4 tolylene diisocyanate, 2,6 tolylene diisocyanate, mixtures of 2,4 tolylene diisocyanate and 2,6 tolylene diisocyanate, diphenyl methane 2,4' diisocyanate, diphenyl methane 4,4' diisocyanate, mixtures of diphenyl methane 2,4' diisocyanate and diphenyl methane 4,4' diisocyanate. naphthalene 1.5 diisocyanate. triphenvi methane 4,4', 4'' triisocvanate or polymeric derivatives of such isocyanates. More preferably, the isocyanate is diphenyl methane 4,4' diisocyanate polymeric or derivatives thereof. Most preferably, the isocyanate is diphenyl methane 4,4' diisocyanate. Preferably, the isocyanate content in the prepolymers is about 0.1 percent by weight or greater, more preferably about 1.0 percent or greater and most preferably about 1.2 percent or greater. Preferably, the isocyanate content in the prepolymers is in the range of about 10 percent by weight of less, more preferably about 5.0 percent or less and most preferably about 2.0 percent or less.

The isocyanate functional prepolymers are present in the adhesive composition in sufficient amount such that the adhesive is capable of bonding glass or coated plastic to the desired substrate such as metal, plastic, fiberglass or composites including substrates coated with acid resistant paint. Preferably, the isocyanate functional prepolymer is present in an amount of about 1 part by weight or greater based on 100 parts of the adhesive composition, more preferably about 2 parts by weight or greater and most preferably about 3 parts by weight or greater. Preferably, the isocyanate functional prepolymer is present in an amount of about 70 parts by weight or less based on 100 parts of the adhesive composition, more preferably about 20 parts by weight or less and most preferably about 10 parts by weight or less.

The adhesive composition may further comprise one or more catalysts which catalyze the silanol condensation reaction. Catalysts useful for the silanol condensation reaction are well-known in the art. Preferred catalysts are organo tin compounds, especially preferred are tin II and tin IV compounds. Among preferred tin compounds useful for silanol condensation are dialkyltin(IV) salts of organic carboxylic acids, such as dibutyltin diacetate, dimethyl tin dilaurate, dibutyltin dilaurate, dibutyltin maleate or dioctyltin diacetate; tin carboxylates, such as tin octylate or tin naphthenate; reaction products of dialkyltin oxides and phthalic acid esters or alkane diones; dialkyltin diacetyl acetonates, such as dibutyltin diacetylacetonate (also commonly referred to as dibutyltin acetylacetonate); dialkyltinoxides, such as dibutyltinoxide; tin(II) salts of organic carboxylic acids, such as tin(II) diacetate, tin(II) dioctanoate, tin(II) diethylhexanoate or tin(II) dilaurate; dialkyl tin (IV) dihalides, such as dimethyl tin dichloride; and stannous salts of carboxylic acids, such as stannous octoate, stannous oleate, stannous acetate, or stannous laurate. These silanol condensation catalysts may be used individually or in combinations of 2 or more. Preferred catalysts are the dialkyl tin dicarboxylates, dialkyl tin oxides, dialkyl bis(acetylacetonates), reaction products of dialkyltin oxide and phthalic acid esters or an alkane dione, dialkyltin halides and dialkyl tin oxides. Even more preferred catalysts are dibutyltin dilaurate, dimethyltin dilaurate, dibutyltin maleate, dibutyltin diacetate, tin octylate, tin naphthenate, reaction products of dibutyltin oxide and phthalic acid esters or pentanedione, dibutyl tin diacetylacetonate, dibutyltinoxide, dimethyl tin chloride and the like. The amount of catalyst used in the formulation is that amount which facilitates the cure of the adhesive without causing degradation of the adhesive after cure. The amount of silanol condensation catalyst in the adhesive formulation is preferably about 0.01 parts by weight or greater, based on 100 parts of the adhesive composition, more preferably about 0.1 parts by weight or greater, and most preferably about 0.2 parts by weight or greater, and preferably about 5 parts by weight or less, even more preferably about 1.0 parts by weight or less and most preferably about 0.4 parts by weight or less.

The adhesive composition may further contain one or more titanates or zirconates having one or more ligands comprising hydrocarbyl phosphate esters and/or hydrocarbyl sulfonate esters. The titanates and zirconates enhance the speed of bonding to the coated substrate and speed of cure of the adhesive. The titanates and zirconates useful contain from about 1 to about 3 ligands comprising hydrocarbyl phosphate esters and/or hydrocarbyl sulfonate esters and about 1 to 3 hydrocarbyl ligands which may further contain unsaturation and heteroatoms such as oxygen, nitrogen and sulfur. Preferably the titanates and zirconates contain from about 2 to about 3 ligands comprising hydrocarbyl phosphate esters and/or hydrocarbyl sulfonate esters, preferably 3 of such ligands and about 1 to 2 hydrocarbyl ligands, preferably 1 hydrocarbyl ligand. Preferred zirconates and titanates correspond to Formula 6:

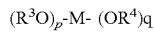  Formula 6;

wherein:

M is separately in each occurrence Ti or Zr;

$R^3$ is separately in each occurrence a $C_1$-$C_{12}$ alkyl group or a $C_{7-20}$ alkaryl group wherein the alkyl or alkaryl groups may optionally contain one or more oxygen atoms or unsaturation;

$R^4$ is separately in each occurrence

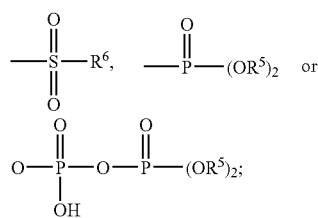

$R^5$ is separately in each occurrence a $C_1$-$C_{12}$ alkyl group or a $C_{7-12}$ alkaryl group;

$R^6$ is separately in each occurrence a $C_1$-$C_{12}$ alkyl or $C_{7-20}$ alkaryl group;

p is separately in each occurrence 1 or 2; and q is separately in each occurrence 2 or 3;

wherein the sum of p and q equals 4.

Preferably M is Ti. More preferably, $R^3$ is separately in each occurrence propyl or a group corresponding to the formula

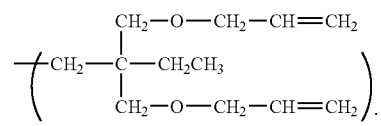

More preferably, $R^4$ is

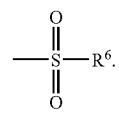

Preferably, $R^5$ is separately in each occurrence $C_1$-$C_{12}$ alkyl, more preferably $C_{8-10}$ alkyl and most preferably octyl.

Preferably, $R^6$ is separately in each occurrence a $C_{12-20}$ alkaryl group, and more preferably $R^6$ is

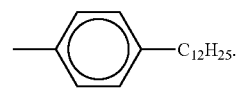

Preferably, p is separately in each occurrence 1 or 2; and most preferably 1. Preferably, q is separately in each occurrence 2 or 3, and most preferably 3. Preferred titanates and zirconates include isopropyl tri(dioctyl)pyrophosphato titanate (available from Kenrich Chemicals under the designation KR38S), neopentyl(diallyl)oxy, tri(dodecyl)benzene-sulfonyl titanate (available from Kenrich Chemicals under the trademark and designation LICA 09), neopentyl(diallyl)oxy, trioctylphosphato titanate (available from Kenrich Chemicals under the trademark and designation LICA 12), neopentyl(diallyl)oxy, tri(dodecyl)benzene-sulfonyl zirconate (available from Kenrich Chemicals under the designation NZ 09), neopentyl(diallyl)oxy, tri(dioctyl)phosphato zirconate (available from Kenrich Chemicals under the designation NZ 12), and neopentyl(diallyl)oxy, tri(dioctyl)pyro-phosphato zirconate (available from Kenrich Chemicals under the designation NZ 38). The most preferred titanate is tri(dodecyl)benzene-sulfonyl titanate (available from Kenrich Chemicals under the designation LICA 09). The titanates are preferred over the zirconates. The titanate or zirconate is present in sufficient amount to enhance the speed of bonding (link up) to the coated substrate and the speed of cure of the adhesive. The titanate is present in an amount of about 0.05 parts by weight based on 100 parts of adhesive or greater and most preferably 0.1 parts by weight or greater. The titanate is present in an amount of 1.0 part by weight based on 100 parts of the adhesive or less, more preferably 0.4 parts by weight or less and most preferably 0.3 parts by weight or less.

The adhesive composition may further comprise an anhydrous strong organic acid which is miscible with the polymer and which enhances the bonding of the adhesive to an unprimed coated substrate, a glass surface and/or the surface of a ceramic frit located on a glass surface. Miscible with the polymer means that the organic acid easily mixes with the polymer. Anhydrous as used in this context refers to materials which contain no more than trace amounts of water; particularly the amount of water is less than that amount which causes the polymer to undergo significant curing. The level of curing can be measured by the viscosity growth of the adhesive. Preferably, the viscosity growth in storage, in an inert essentially water free environment, over a period of 3 days at 54° C. is less than about 50 percent, more preferably less than about 30 percent and most preferably less than about 20 percent. In a preferred embodiment the strong organic acid is an organic sulfonic acid or an organic phosphoric acid. Preferably the sulfonic acid corresponds to the Formula 7

Formula 7

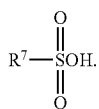

Preferably, the phosphoric acid corresponds to the Formula 8.

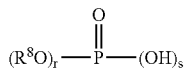

$R^7$ is separately in each occurrence a $C_{1-12}$ alkyl or $C_{7-30}$ alkaryl group. $R^8$ is separately in each occurrence $C_{1-10}$ alkyl; $C_{6-12}$ aryl or $C_{6-12}$ alkyl substituted aryl. r is separately in each occurrence 1 or 2. s is separately in each occurrence 1 or 2. The sum of r and s is 3. Preferably $R^7$ is separately in each occurrence an alkyl substituted benzyl or an alkyl substituted naphthyl. Preferably, r is 2. Preferably, s is 1. Preferably, $R^8$ is separately in each occurrence phenyl, butyl or methyl. More preferred sulfonic acids are dodecyl benzene sulfonic acid, dinonylnaphthalene sulfonic acid and p-toluene sulfonic acid. A most preferred sulfonic acid is dodecyl benzene sulfonic acid. More preferred phosphoric acids are dibutyl phosphate, and diphenyl phosphate.

The organic acid is present in a sufficient amount that the adhesive composition is capable of bonding to coated substrates, and preferably, glass or ceramic enamels located on the glass, more preferably without the need for preapplication of a primer. The organic acid is present preferably in an amount of about 0.1 parts by weight or greater, based on 100 parts of the adhesive, and most preferably about 0.2 parts by weight or greater. Preferably, the organic acid is present in an amount of about 1.0 part by weight or less based on 100 parts by weight of the adhesive, more preferably about 0.8 parts by weight or less and most preferably about 0.6 parts by weight or less.

The adhesive may also contain a catalyst which catalyzes the reaction of isocyanate moieties with water or an active hydrogen containing compound. The catalyst can be any organometallic catalyst known to the skilled artisan for the reaction of isocyanate moieties with water or active hydrogen containing compounds. Among preferred catalysts are organotin compounds and metal alkanoates. Included in the useful catalysts are organotin compounds such as alkyl tin oxides, stannous alkanoates, dialkyl tin carboxylates and tin mercaptides. Stannous alkanoates include stannous octoate. Alkyl tin oxides include dialkyl tin oxides, such as dibutyl tin oxide and its derivatives. The organotin catalyst is preferably a dialkyltin dicarboxylate or a dialkyltin dimercaptide. The dialkyltin dicarboxylate preferably corresponds to the formula $(R^9OC(O))_2—Sn—(R^9)_2$ wherein $R^9$ is independently in each occurrence a $C_{1-10}$ alkyl, preferably a $C_{1-3}$ alkyl and most preferably a methyl. Dialkyl tin dicarboxylates with lower total carbon atoms are preferred as they are more active catalysts in the compositions of the invention. The preferred dialkyl dicarboxylates include 1,1-dimethyltin dilaurate, 1,1-dibutyltin diacetate and 1,1-dimethyl dimaleate. Preferred metal alkanoates are bismuth alkanoates, with bismuth octoate or bismuth neodecanoate more preferred. The organotin catalyst is present in sufficient amounts to speed the cure of the isocyanate moieties, but not so much that the catalyst catalyzes degradation of the cured adhesive over time. The organo tin catalyst is present in an amount of about 60 parts per million or greater based on 100 parts of the adhesive, more preferably 120 parts by million or greater. The organo tin catalyst is present in an amount of about 1.0 percent or less based on 100 parts of the adhesive, more preferably 0.5 percent by weight or less and most preferably 0.1 percent by weight or less.

The adhesive composition of the invention may further comprise silane adhesion promoters. Preferably, these silane compounds have isocyanate and hydrolyzable silicone moieties. These compounds are present in sufficient amount to achieve adhesion to desired coating system. The isocyanato silanes useful are described by formula 5 described hereinbefore. Preferred isocyanato silanes include gamma-isocyanatopropyltrimethoxy silane, gamma-isocyanatopropylmethyldimethoxy silane, and gamma-isocyanatopropyltriethoxy silane. The isocyantosilanes are present preferably in an amount of about 0.5 parts by weight based on 100 parts of the adhesive or greater, more preferably about 3.5 parts by weight or greater and most preferably about 5 parts by weight or greater. The isocyanto silanes are present in an amount of about 10 parts by weight based on 100 parts of the adhesive or less, more preferably about 8 parts by weight or less and most preferably about 6 parts by weight or less.

The composition may further comprise a silicone-containing dehydrating compound. U.S. Pat. No. 4,977,228 discloses silicon-containing dehydrating compounds at column 10, line 27 to column 11, line 12, incorporated herein by reference. The silicon-containing dehydrating compound having three or four hydrolyzable groups bonded to the silicon atom is used to improve the storage stability of the curable polymer composition of the present invention, namely, to prevent increase of viscosity or gelation during storage. The hydrolyzable group bonded to the silicon atom of the silicon-containing compound may be the same as described above in connection with the silicon-containing reactive group. Preferably, the hydrolyzable group of the dehydrating compound is more reactive than that of the silicon-containing reactive group. When the number of the hydrolyzable groups bonded to the silicon atom of the silicon-containing compound is less than 3, the storage stability is not sufficiently improved, since the hydrolyzable groups of the silicon-containing dehydrating compound preferentially react with water in the composition, whereby the storage stability of the composition is improved.

Preferably, silicon-containing dehydrating compounds correspond to Formula 9:

  Formula 9 wherein $R^{10}$ is separately in each occurrence a substituted or unsubstituted monovalent hydrocarbon group, and X is a hydrolyzable group wherein each X may be the same or different, and n is 3 or 4. $R^{10}$ is preferably a substituted or unsubstituted monovalent hydrocarbon group having 1 to 18 carbon atoms. More preferably, $R^{10}$ is substituted or unsubstituted alkyl groups, substituted or unsubstituted aryl groups and the like. More preferably, $R^{10}$ is substituted or unsubstituted methyl, ethyl, vinyl, methacryloxypropyl, phenyl, methylphenyl, and the like. As the hydrolyzable group X, an alkoxy group is preferred. Specific examples of preferred silicon-containing dehydrating compound include trimethoxysilane, tetramethoxysilane, triethoxysilane, tetraethoxysilane, methyldimethoxysilane, methyltrimethoxysilane, ethyl silicate, methyltriethoxysilane, n-propyltrimethoxysilane, methyldiisopropenyloxysilane, methyltriisopropenoxysilane, phenyldimethoxysilane, phenyltrimethoxysilane, phenyltriethoxysilane, vinyltrimethoxysilane, vinyltriethoxysilane, γ-methacryl-oxypropyltrimethoxysilane, methyldiacetoxysilane, methyltriacetoxysilane, γ-amino-propyltrimethoxysilane, γ-aminopropyltriethoxysilane, γ-mercapto-propyltrimethoxysilane, γ-glycidoxy-propyltrimethoxysilane, bis(dimethylketoxime)-methylsilane, bis(cyclohexylketoximate)-methylsilane, etc. Among them, alkyltrimethoxysilanes, (such as methyltrimethoxysilane) and vinyltrimethoxysilane are preferable since they are easily available and have better dehydration effects. The silicon-containing dehydrating compound is preferably present in an amount sufficient to prevent reaction of the reactive components while in storage. Preferably, the silicon-containing dehydrating compound is present in an amount of about 0.01 parts by weight or greater per 100 parts by weight of the total amount of the adhesive composition, preferably about 0.1 parts by weight or greater. Preferably, the silicon-containing dehydrating compound is present in an amount of about 2 parts by weight or less per 100 parts by weight of the total amount of the adhesive composition, preferably about 1 part by weight or less. When the amount of the silicon-containing dehydrating compound is less than the above lower limit, the storage stability of the curable polymer composition is not sufficiently improved, and when the amount is larger than the above upper limit, the curing rate of the composition decreases.

The adhesive composition may contain other additives commonly used in adhesives formulations as known to those skilled in the art. The adhesive of the invention may be formulated with fillers known in the art for use in adhesive compositions. By the addition of such materials, physical properties such as viscosity, flow rates, rheology and the like can be modified. However, to prevent premature hydrolysis of the moisture sensitive groups of the prepolymer, it is preferable to thoroughly dry the fillers before admixture therewith. Preferred fillers useful include reinforcing fillers. Preferred reinforcing fillers are well-known to those skilled in the art and include carbon black, titanium dioxide, calcium carbonate, surface treated silica, titanium oxide, fumed silica, and talc. The most preferred reinforcing filler is carbon black. In one embodiment, more than one reinforcing filler may be used, of which one is carbon black, and a sufficient amount of carbon black is used to provide the desired black color to the adhesive. Preferably, the only reinforcing filler used is carbon block. The reinforcing fillers are used in sufficient amount to increase the strength of the adhesive and to provide thixotropic properties to the adhesive. Preferably, the reinforcing filler is present in an amount of about 1 part by weight or greater based on 100 parts by weight of the adhesive composition, more preferably about 15 parts by weight or greater, even more preferably about 20 parts by weight or greater and most preferably about 25 parts by weight or greater. Preferably, the reinforcing filler is present in an amount of about 40 parts or less by weight based on 100 parts by weight of the adhesive composition, more preferably about 35 parts by weight or less and most preferably about 33 parts by weight or less.

Among optional materials in the adhesive composition are clays. Preferred clays useful in the invention include kaolin, surface treated kaolin, calcined kaolin, aluminum silicates and surface treated anhydrous aluminum silicates. The clays can be used in any form which facilitates formulation of a pumpable adhesive. Preferably, the clay is in the form of pulverized powder, spray dried beads or finely ground particles. Clays may be used in an amount of about 0 part by weight based on 100 parts of the adhesive composition or greater, more preferably about 1 part by weight or greater and even more preferably about 6 parts by weight or greater. Preferably, the clays are used in an amount of about 30 parts by weight or less based on 100 parts of the adhesive composition and more preferably about 20 parts by weight or less.

The adhesive composition of this invention may further comprise plasticizers so as to modify the rheological properties to a desired consistency. Such materials are preferably free of water, inert to reactive groups and compatible with the prepolymers used in the adhesive. Suitable plasticizers are well-known in the art and preferable plasticizers include alkyl phthalates, such as dialkyl phthalate, partially hydrogenated terpene, commercially available as "HB-40"; trioctyl phosphate; epoxy plasticizers; toluene-sulfamide; chloroparaffins; adipic acid esters; castor oil; toluene; xylene; n-methylpyrolidinone; and alkyl naphthalenes. More preferred plasticizers are the phthalates. The more preferred plasticizers are the dialkyl phthalates. Most preferred are phthalates wherein the alkyl group is a mixed linear $C_7$, $C_9$ and $C_{11}$ alkyl; diisononyl phthalate and diisodecyl phathalate. The amount of plasticizer in the adhesive composition is that amount which gives the desired rheological properties, which is sufficient to disperse the catalyst and other components in the system and to give the desired viscosity. The amounts disclosed herein include those amounts added during preparation of the prepolymer and during compounding of the adhesive. Preferably plasticizers are used in the adhesive composition in an amount of about 0 part by weight or greater based on 100 parts by weight of the adhesive composition, more preferably about 5 parts by weight or greater, even more preferably about 10 parts by weight or greater and most preferably about 15 parts by weight or greater. The plasticizer is preferably used in an amount of about 35 parts by weight or less based on 100 parts of the adhesive composition, more preferably about 30 parts by weight or less and most preferably about 25 parts by weight or less.

Optionally, the adhesive composition may further comprise a thixotrope. Such thixotropes are well-known to those skilled in the art and include alumina, limestone, talc, zinc oxides, sulfur oxides, calcium carbonate, perlite, slate flour, salt (NaCl), and cyclodextrin. The thixotrope may be added to the adhesive of the composition in a sufficient amount to give the desired rheological properties. Preferably the thixotrope is present in an amount of about 0 parts by weight or greater based on 100 parts of the adhesive composition, and more preferably about 1 part by weight or greater. Preferably the optional thixotrope is present in an amount of about 10 parts by weight or less based on 100 parts of the adhesive composition and more preferably about 2 parts by weight or less.

As used herein, all parts by weight relative to the components of the adhesive composition are based on 100 total parts by weight of the adhesive composition and all percentages by weight are based on the weight of the adhesive composition. The sealant composition of this invention may be formulated by blending the components together using means well-known in the art. Generally, the components are blended in a suitable mixer. Such blending is preferably conducted in an inert atmosphere and in the absence of atmospheric moisture to prevent premature reaction. It may be advantageous to add some or all of the plasticizers to the reaction mixture for preparing the isocyanate functional prepolymer so that such mixture may be easily mixed and handled. Alternatively, the plasticizers can be added during blending of all the components. Once the sealant composition is formulated, it is packaged in a suitable container such that it is protected from atmospheric moisture. Contact with atmospheric moisture could result in premature crosslinking of the prepolymer.

The adhesive composition of the invention is preferably used to bond glass or plastic coated with an abrasion resistant coating to another substrate together. The adhesive composition is applied to the glass or plastic surface or the other substrate, preferably the glass or plastic surface, and is thereafter contacted with a second substrate. Thereafter, the adhesive is exposed to curing conditions. In a preferred embodiment, the other substrate is a plastic, metal, fiberglass or composite substrate which may optionally be coated, i.e., painted. This method is especially effective for substrates painted with an acid resistant paint. In preferred embodiments, the surfaces to which the adhesive is applied are cleaned prior to application, see for example, U.S. Pat. Nos. 4,525,511; 3,707,521 and 3,779,794, incorporated herein by reference. The glass is prepared by cleaning the surface to which the adhesive composition is to be applied. A solvent wipe can be used to do this. Generally, a cloth or other device with an appropriate solvent is used to clean the surface. Thereafter a primer may be applied to the portion of the window to which the adhesive is to be applied. Glass primers and application methods for such primers are well-known in the art. Typically the primer is applied with a brush or by a robot. In preferred embodiments, a primer is not necessary where the adhesive is formulated so as to eliminate the need for one. If a primer is used on the glass surface, a preferred primer composition is any known glass primer system which works with polyurethane adhesive systems. Examples of such systems are BETASEAL™ 43518 primer and BETASEAL™ 43520A primer, BETASEAL™ 43526 primer and BETASEAL™ 16100 primer available from The Dow Chemical Company. In a preferred embodiment of the invention, the substrate is a building or an automobile. The adhesive is preferably deposited as a bead on the portion of the glass or an abrasion resistant coated plastic window to be bonded into the substrate. The bead can be deposited by any known method to those skilled in the art. In one embodiment, the bead can be deposited using a caulking gun or similar type of manual application device. In another embodiment, the bead may be deposited by an extrusion apparatus such as a robotic extrusion apparatus. The adhesive is located on the portion of the window which will be contacted with the structure which it will be bonded. In one preferred embodiment, the adhesive is placed about the periphery of one face of the window. Typically the adhesive is in the form of a bead located about the periphery of the window. For automobile windshields the bead adhesive can be deposited on the surface of the ceramic enamel, known as the frit, located on the surface of the window located about the periphery of the window. Preferably, the bead is a profiled shape along the cross-sectional plane. In the embodiment where the glass or plastic is a window designed for use in automobiles, the bead is applied to the portion of the glass or plastic to be contacted with the flange of the automobile window. The window can then be placed into the structure with the adhesive contacting both the window and the structure. This contacting is performed by means well-known to those skilled in the art. In particular, the window can be placed in the structure by hand, by the use of a robot and the like. Generally, the adhesives of the invention are applied at ambient temperature in the presence of atmospheric moisture. Exposure to atmospheric moisture is sufficient to result in curing of the adhesive. Curing may be further accelerated by applying heat to the curing sealant by any means known to one skilled in the art, for instance by convection heat, or microwave heating. Preferably, the sealant of the invention is formulated to provide a working time of about 6 minutes or greater, more preferably about 10 minutes or greater. Preferably, the working time is about 15 minutes or less and more preferably about 12 minutes or less. Further, the adhesive of the invention demonstrates a lap shear according to the process described hereinafter after three days or curing at 23° C. and 50 percent relative humidity (RH) of about 360 psi (2.48 MPa) or greater and more preferably about 500 psi (3.45 MPa) or greater. Preferably, the adhesives of the invention demonstrate a tack free time of 35 minutes or less. The system of the invention can be used to bond glass or plastic coated with an abrasion resistant coating, to other substrates such as metal or plastics. The plastic is preferably coated with an abrasion resistant coating. The plastic can be any plastic which is clear, such as polycarbonate, acrylics, hydrogenated polystyrene or hydrogenated styrene conjugated diene block copolymers having greater than 50 percent styrene content. The coating can comprise any coating which is abrasion resistant such as a polysiloxane coating. Preferably, the coating has an ultraviolet pigmented light blocking additive. Preferably, the glass or plastic window has an opaque coating disposed in the region to be contacted with the adhesive to block UV light from reaching the adhesive.

Molecular weights as described herein are determined according to the following procedure: determined using the Waters Model 590 Gel Permeation Chromatograph. This unit is connected to a multiwave length detector and a differential refractometer to measure the elution volume. A column of styrogel is used for the size exclusion and it can determine molecular weights from 250 to 50,000. The molecular weight of the prepolymer is then determined by measuring the elution volume through this column using tetrahydrofuran as the eluting solvent. The molecular weight is then calculated from a calibration curve of molecular weight vs. elution volume obtained from a polystyrene polyethylene glycol column. The quoted molecular weights are weight average molecular weights unless otherwise specified.

SPECIFIC EMBODIMENTS

The following examples are provided to more fully illustrate the invention, and are not intended to limit the scope of the claim. Unless otherwise stated, all parts and percentages are by weight.

The following are tests used for the prepared sealants.

Quick Knife Adhesion Test

Quick Knife Adhesion (QKA) is run according to SAE J1720 method. A 6.3 mm (width)×6.3 mm (height)×100 mm (length) size sealant bead is placed on the tested substrate and the assembly is cured for a specific time in the condition of 23° C. and 50 percent relative humidity. The cured bead is then cut with a razor blade through to the tested substrate at a 45 degree angle while pulling back the end of the bead at 180 degree angle. Notches are cut every 3 mm on the painted surface. The degree of adhesion is evaluated as adhesive failure (AF) and/or cohesive failure (CF). In case of AF, the cured bead can be separated from the tested substrate surface, while in CF, separation occurs within the sealant adhesive as a result of cutting and pulling. The tested substrate can be used as supplied, primed with primers, or pre-wiped with isopropanol (IPA) or naphtha (NP).

Lap Shear Test

An adhesive bead approximately 6.3 mm wide by 8 mm high is applied along the width of the glass substrate (25 mm×75 mm) and approximately 6 mm to 12 mm from the primed end. The glass is treated by wiping a cloth containing BETASEAL™ 43518 primer available from The Dow Chemical Company, wiping off the BETASEAL™ 43518 primer with a clean cloth and thereafter applying to the glass BETASEAL™ 43520A primer available from the Dow Automotive business unit of The Dow Chemical Company. The painted substrate is immediately placed on the adhesive and the sample is allowed to cure at the condition of the 23° C. and 50 percent relative humidity for 3 to 7 days. The sample was then pulled right away for initial lap shear strength or after more environmental exposures at a rate of 1 inch/minute (2.5 cm/min) with an Instron Tester. A group of at 3 lap shear samples are tested and averaged per condition unless specified otherwise. The load at break of the sample is recorded. For weatherability testing, samples are first cured for 7 days under 23° C. and 50 percent relative humidity and then placed in the Weather-O-Meter (WOM) chamber. SAE J1885 conditions are used for the testing chamber unless specified otherwise.

Viscosity

Viscosities of prepolymers as described herein are determined according to the procedure disclosed in Bhat, U.S. Pat. No. 5,922,809 at column 12 lines 38 to 49, incorporated herein by reference. Viscosities of adhesives as described herein are determined using press flow (PF). The press flow is the time it takes for 20 grams of adhesive to pass through a 0.157 in. (4 mm) orifice at 80 psi (552 kPa) pressure unless specified otherwise. 3 day-54° C. heat age growth of the adhesive is defined as the press flow increase after 3 day-54° C. heat treatment on the adhesive divided by the initial press flow of the adhesive.

Tack Free Time

Tack-free time is measured according to the following test procedure. A 150 mm long and 6 mm diameter adhesive bead is laid on a release paper under 23° C. and 50 percent relative humidity while the timer is started. The bead is then touched gently using a polyethylene film and the time passed to when the bead is tack free and the polyethylene film is clean from the contact of the bead is recorded.

Tensile and Elongation

The adhesive is dispensed between two releasing papers and then pressed into a circular shape with a thickness of 3 mm. After the adhesive is cured under 23° C. and 50 percent relative humidity for 7 days, the tensile strength and elongation is tested at 20 inch/min according to ASTM D412 method with a die C. Tensile strength is reported in the unit of pound/inch$^2$ (psi) and elongation is reported in percentage.

Ingredients Used

VORANOL™ 220-056 polyol is polyoxypropylene based diol with molecular weight (MW) about 2000 and hydroxyl equivalent weight (EW) of 1000 available from The Dow Chemical Company.

VORANOL™ 232-036 polyol is polyoxypropylene based triol with molecular weight (MW) of about 4500 and hydroxyl equivalent weight (EW) of 1500 available from The Dow Chemical Company.

METACURE™ T-9 tin catalyst is stannous octoate available from Air Products Chemical.

N,N'-bis(3-trimethoxysilyl propyl)amine is available from GE Silicones.

BETASEAL™ 43518 primer is an organosilane containing glass primer available from The Dow Chemical Company.

BETASEAL™ 43520A primer is an isocyanate containing glass primer available from The Dow Chemical Company.

BETASEAL™ 43526 primer is a non-isocyanate glass primer available from The Dow Chemical Company.

ISONATE™ 125M is diphenylmethane-4,4'-diisocyanate (methylene diphenyl diisocyanate) (MDI) having an equivalent weight of 125 available from The Dow Chemical Company.

SILQUEST™ A-171 is vinyl trimethoxysilane available from GE Silicones.

DDBSA is dodecylbezene sulfonic acid available from Spectrum Chemicals.

SAX™ 400 silane functional prepolymer is trifunctional polypropyleneoxide polyether with dimethoxymethyl silyl terminal groups having a molecular weight of about 20,000 available from Kaneka Corporation.

Alkylphthalate plasticizers are available from BASF Corporation.

Isocyanatopropyl trimethoxysilane is available from GE Silicones.

LICA™ 09 titanate catalyst is neopentyl(diallyl)oxy-tri (dodecyl)benzene-sulfonyl titanate available from Kenrich Chemicals.

Preparation of Polyurethane Prepolymer A

Into a 2-liter kettle equipped with an agitator and a heating jacket was charged 336.14 g VORANOL™ 220-56 polyol, 487.13 g VORANOL™ 232-036 polyol, and 29.58 g of dialkyl phthalate plasticizer under nitrogen protection. The reactants were mixed and heated under nitrogen until the mixture reached 54° C. Once the mixture reached 54° C., 148.48 g of diphenylmethane 4,4'-diisocyanate (ISONATE™ 125M) stored at 45° C. was added and mixed in. Then, 0.07 g of METACURE™ T-9 tin catalyst was added dropwise and slowly. The reaction exothermed and after the reaction temperature peaked, the reaction was held between 80° C. and 85° C. for 30 minutes. Then, the temperature set point on heating unit was set at 60° C. Thereafter, 463.25 g of dialkyl phthalate and 14.20 g of diethylmalonate were added. The mixture was agitated for 15 minutes. Thereafter, N,N'-bis(3-trimethoxypropyl)amine (21.15 g) was added into the kettle and mixed for 60 minutes. The reaction was stopped and the prepolymer was stored in an air tight container purged with nitrogen. The prepolymer had a viscosity of 10,500 centipoise (25° C.) and an isocyanate percentage of 1.31 by weight.

EXAMPLE 1

SAX 400 silane functional prepolymer in the amount of 630 g and SILQUEST™ A171 vinyl trimethoxysilane in the amount of 3 g were charged into a 1 gallon mixer under nitrogen. The mixture was degassed under vacuum and mixed for 5 minutes. The vacuum was broken with nitrogen. 90 g of prepolymer A described above, 75 g of isocyanatopropyl trimethoxysilane and 244.5 g of alkylphthalate plasticizer were added into the mixer. The mixture was degassed under vacuum and mixed for 5 minutes. The vacuum was broken once again with nitrogen. 450 g of dried carbon black was added. The vacuum was applied slowly. When half of the vacuum was achieved, mixing was started to wet out the fillers for 2 minutes. The vacuum valve was then fully opened and mixing was continued under full vacuum for 20 minutes. The mixture was scraped down under nitrogen. 4.5 g of DDBSA along with 3.0 g of LICA™ 09 were added into the mixture and the full vacuum was applied again before additional mixing. The mixture was mixed under vacuum for another 10 minutes. The vacuum was broken with nitrogen and the adhesive composition was packaged into sealed tubes. The resulting adhesive had an initial press flow of 30.5 seconds. The press flow was 40.5 seconds after the adhesive was stored for 3 days at 54° C. Tack free time was 22 minutes at 23° C. and 50 percent relative humidity. The tensile and elongation were 722 psi and 706 percent, respectively, based on the test methods described hereinbefore.

Samples were prepared for (QKA) testing on coated metal coupons. An adhesive bead from Example 1 was placed on four different coated metal coupons of 1 inch×4 inch (2.54 cm×10.2 cm) dimension. These metal coupons were coated with DuPont's GEN™ IV clear coat, DuPont's GEN™ VI clear coat, PPG's ODCT™ 8000 carbamate clear coat and PPG's MAC™ 8000 carbamate clear coat, respectively. After 3 day cure of these samples at 23° C. and 50 percent relative humidity, (QKA) was run and all samples exhibited a failure mode of 100 percent cohesive failure (tearing of the adhesive bead and no adhesive failure at the substrate surface).

The adhesive of Example 1 can bond to the glass coupons without the use of a primer. Four QKA samples were also prepared directly on glass coupons with Bismuth-Zinc sag bent frit. These samples were placed at 23° C. and 50 percent relative humidity conditions for 3 days after application of adhesive to substrate. One sample was tested with (QKA). The remaining three samples were exposed to three sets of treatments, respectively, before the QKA testing: 1) 10 days water immersion at 32° C.; 2) 14 days at 38° C. and 100 percent relative humidity; and 3) 14 days at 90° C. All samples showed a mode of 100 percent cohesive failure (tearing of the adhesive bead and no adhesive failure at the substrate surface). Four QKA samples as described above were prepared except on glass coupons having a zinc enamel sag bent frit. All samples showed 100 percent cohesive failure (CF) in the described tests.

Samples for lap shear testing were prepared using the adhesive of from Example 1. The first substrate in a lap shear sample was a GEN™ VI coated metal coupon with a dimension of 1 inch by 4 inch (2.54 cm×10.2 cm). GEN™ VI coated metal coupons were prepared by spraying the DuPont's GEN™ VI clear coat onto metal coupons which were then baked at 310° F. (154° C.) for 30 minutes. The second substrate in a lap shear sample was a glass coupon of 1 inch by 3 inch with a zinc enamel frit which was primed with BETASEAL™ 43518 primer and then BETASEAL™ 43520A primer. Lap shear samples were separated into A, B and C groups which went through conditions 1, 2 and 3 respectively before testing. In condition 1, the lap shear samples were stored for 3 days at 23° C. and 50 percent relative humidity once they were prepared. In condition 2, lap shear samples were placed for 14 days at 38° C. and 100 percent relative humidity after their initial cure. In condition 3, lap shear samples were placed for 2,000 hours in weatherometer chamber under SAE J1885 settings after their initial cure. Lap shear results from samples A through C are listed in Table 1. Initial cure refers to storage at 23° C. and 50 relative humidity before the sample was exposed to the reacted conditions.

Lap shear samples were also prepared in the same way as for samples A to C except using metal coupons which were coated with PPG's ODCT™ 8000 carbamate coating which was baked at 310° F. (154° C.) for 30 minutes. Results were listed in Table 1 from sample D through sample F. Sample G was prepared in the same manner as for Samples D to F except the glass coupons were primed with BETASEAL™ 43526 primer instead of BETASEAL™ 43518 primer and BETASEAL™ 43520A primer before applying the adhesive. Lap shear results for sample G is included in Table 1.

TABLE 1

| Sample | Coatings on the metal coupon | Sample Conditions | Lap shear psi (MPa) | Failure Mode |
|---|---|---|---|---|
| A | GEN ™ VI | Condition 1 | 436.1 (3.007) | 100% CF |
| B | GEN ™ VI | Condition 2 | 560.0 (3.861) | 100% CF |
| C | GEN ™ VI | Condition 3 | 451.8 (3.115) | 100% CF |
| D | ODCT ™ 8000 | Condition 1 | 417.8 (2.881) | 95% CF/5% AF |
| E | ODCT ™ 8000 | Condition 2 | 534.1 (3.682) | 100% CF |
| F | ODCT ™ 8000 | Condition 3 | 536.1 (3.696) | 100% CF |
| G | ODCT ™ 8000 | Condition 3 | 485.0 (3.344) | 100% CF |

EXAMPLES 2 TO 3 AND COMPARATIVE EXAMPLE 4

Three adhesive compositions using the components described in Table 2 were prepared using the procedure as described in Example 1. (QKA) beads from these adhesives were applied to metal coupons coated with PPG ODCT™ 8000 carbamate clear coat. After 7 days initial cure at 23° C. and 50 percent relative humidity (RH), QKA testing was performed and results are included in the Table 2.

QKA beads from Example 1, Example 3 and Comparative 4 were also applied to clear glass coupons of 1 inch×6 inch (2.54 cm×15.2 cm) which were primed with BETASEAL™ 43518 and BETASEAL™ 43520A primers. These QKA samples were separated into two groups after their 7 days initial cure at 23° C. and 50 percent relative humidity conditions (CT conditions). The first group was checked with QKA testing right away. The second group was placed in an oven at 110° C. for different time periods before the QKA testing was performed. These QKA results are listed in Table 3 (CF=cohesive failure; AF=adhesive failure from the substrate; TF=a thin layer film left on the substrate after testing).

TABLE 2

| Example/Component | Adhesive 1 g (%) | Adhesive 2 g (%) | Adhesive 3 g (%) | Comparison 4 g (%) |
|---|---|---|---|---|
| SAX ™ 400 | 630 (42) | 675 (45) | 585 (39) | 735 (49) |
| Isocyanatopropyl trimethoxysilane | 75 (5) | 75 (5) | 75 (5) | 75 (5) |
| Isocyanate Functional Prepolymer A | 90 (6) | 45 (3) | 135 (9) | 0 (0) |
| SILQUEST ™ A-171 | 3 (.20) | 3 (.20) | 3 (.20) | 3 (.20) |
| Alkylphthalate | 244.5 (16.3) | 245.25 (16.35) | 247.5 (16.5) | 245.25 (16.35) |
| Carbon Black | 450 (30) | 450 (30) | 447 (29.8) | 435 (29) |
| LICA ™ 09 | 3 (0.2) | 3 (0.2) | 3 (0.2) | 3 (0.2) |
| DDBSA | 4.5 (0.3) | 3.75 (0.25) | 4.5 (0.3) | 3.75 (0.25) |
| Sum | (100) | (100) | (100) | (100) |
| Quick Knife Adhesion after 7 days under 23° C. and 50% RH on PPG's ODCT ™ 8000 carbamate coated metal coupons | 100% CF | 90% CF/10% AF | 100% CF | 100% CF |

TABLE 3

| | Example | | |
|---|---|---|---|
| | Adhesive 1 g (%) | Adhesive 3 g (%) | Comparison 4 g (%) |
| BETASEAL ™ 43518 and BETASEAL ™ 43520A primed clear glass coupon 7 days cure under CT conditions | 100% CF | 100% CF | 100% CF |
| 5 days at 110° C. | 100% CF | 100% CF | 100% CF |
| 10 days at 110° C. | 100% CF | 100% CF | 100% CF |
| 13 days at 110° C. | 100% CF | 100% CF | 100% CF |
| 15 days at 110° C. | 100% CF | 100% CF | 10% CF/90% AF |
| 17 days at 110° C. | 100% CF | 100% CF | 5% CF/95% AF |
| 19 days at 110° C. | 95% CF/5% TF | 100% CF | 100% AF |
| 21 days at 110° C. | 95% CF/5% TF | 95% CF/5% TF | 100% AF |

What is claimed is:

1. An adhesive composition comprising a blend of:
   a) one or more silane functional prepolymers comprising a polyether or a polyolefin backbone and silane moieties capable of silanol condensation;
   b) one or more isocyanate functional prepolymers comprising a polyether backbone and isocyanate moieties wherein the isocyanate used is 1,3 phenylene diisocyanate, 1,4 phenylene diisocyanate, 2,4 tolylene diisocyanate, 2,6 tolylene diisocyanate, mixtures of 2,4 tolylene diisocyanate and 2,6 tolylene diisocyanate, diphenyl methane 2,4' diisocyanate, diphenyl methane 4,4' diisocyanate, mixtures of diphenyl methane 2,4' diisocyanate and diphenyl methane 4,4' diisocyanate, naphthalene 1,5 diisocyanate, triphenyl methane 4,4', 4" triisocyanate or polymeric derivatives of such isocyanates;
   c) one or more organotin compounds, titanates or zirconates having one or more ligands comprising a hydrocarbyl phosphate ester or a hydrocarbyl sulfonate ester, or a mixture thereof; and
   d) one or more anhydrous strong organic acids which are miscible with the prepolymers and enhances the bonding of the adhesive to a coated unprimed substrate.

2. An adhesive composition according to claim 1 wherein the silane functional prepolymer is present in an amount of about 1 to about 70 parts by weight and the isocyanate functional prepolymer is present in an amount of about 1 to about 70 parts by weight based on 100 parts of the adhesive formulation.

3. An adhesive according to claim 2 wherein the acid is an organic phosphoric acid or organic sulfonic acid.

4. An adhesive according to claim 3 wherein the titanate or zirconate corresponds to the formula $$(R^3O)_p\text{—M—}(OR^4)_q$$

wherein:

M is separately in each occurrence Ti or Zr;

$R^3$ is separately in each occurrence is $C_{1-12}$ alkyl or $C_{7-12}$ alkaryl;

$R^4$ is separately in each occurrence

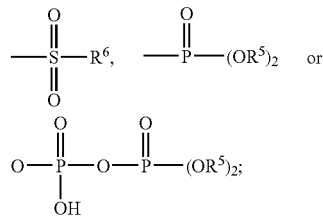

$R^5$ is separately in each occurrence $C_{1-12}$ alkyl;

$R^6$ is separately in each occurrence a $C_{1-12}$ alkyl or $C_{7-20}$ alkaryl group;

p is separately in each occurrence 1 or 2; and q is separately in each occurrence 2 or 3;

wherein the sum of p and q is 4.

5. An adhesive composition according to claim 4 wherein M is Ti.

6. An adhesive composition according to claim 5 wherein the sulfonic acid corresponds to the formula

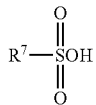

and the phosphoric acid corresponds to the formula

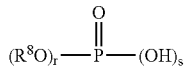

wherein:
$R^7$ is separately in each occurrence a $C_{1-12}$ alkyl or $C_{7-30}$ alkaryl group;
$R^8$ is separately in each occurrence $C_{1-10}$ alkyl; $C_{6-12}$ aryl or $C_{6-12}$ alkaryl;
r is separately in each occurrence 1 or 2;
s is separately in each occurrence 1 or 2;
wherein the sum of r and s is 3.

7. An adhesive composition according to claim 6 comprising:
a) from about 20 to about 70 parts by weight of one or more silane functional polymers;
b) from about 2 to about 20 percent by weight of one or more isocyanate functional prepolymers;
c) from about 0.05 to about 0.5 parts by weight of one or more organo titanates or zirconates; and
d) from about 0.1 to about 0.45 parts by weight of one or more strong organic acids:
wherein the total parts by weight is 100.

8. An adhesive according to claim 7 wherein the weight average molecular weight of the polyether polyol used to prepare the silane functional prepolymer is from about 1,000 to about 50,000.

9. An adhesive according to claim 8 wherein the weight average molecular weight of the isocyanate functional prepolymer is about 2,500 to about 40,000.

10. A method of bonding two or more substrates together which comprises applying an adhesive according to claim 1 to one or more of the substrates; contacting the substrates such that the adhesive is disposed between the substrates; and allowing the adhesive to cure so as to bond the substrates together.

11. A method of bonding glass to a substrate which comprises:
A) applying an adhesive according to claim 1 to either of glass or the substrate;
B) contacting the glass and the substrate such that the adhesive is disposed between the substrate and the glass; and
C) allowing the adhesive to cure to bond the glass to the substrate.

12. A method according to claim 11 wherein the window has a primed or unprimed ceramic frit disposed about the periphery of the window and the adhesive is bonded to the ceramic frit.

13. A method according to claim 11 wherein the substrate is the flange of an automobile adapted for holding a glass window into the automobile.

14. A method according to claim 13 wherein the flange is coated with a paint.

15. A method according to claim 14 wherein the flange is unprimed when it is contacted with the adhesive composition.

16. A method according to claim 13 wherein the window is unprimed when contacted with the adhesive composition.

17. A method according to claim 12 wherein the flange is coated with an acid resistant paint.

18. A composition according to claim 1 wherein the isocyanate used to prepare the isocyanate functional prepolymer is diphenyl methane 4,4' diisocyanate or polymeric derivatives thereof.

19. A composition according to claim 18 wherein the isocyanate used to prepare the isocyanate functional prepolymer is diphenyl methane 4,4' diisocyanate.

* * * * *